Aug. 20, 1946.    W. BILLMAN    2,406,128
EXTENSION PLUG
Filed Nov. 22, 1944

Inventor
Walter Billman

Patented Aug. 20, 1946

2,406,128

UNITED STATES PATENT OFFICE 2,406,128

EXTENSION PLUG

Walter Billman, Philadelphia, Pa.

Application November 22, 1944, Serial No. 564,626

1 Claim. (Cl. 279—2)

This invention relates to extension plugs for machine tool holder shanks and the like and more particularly to extension plugs for extending the shanks of machine tool holders used in turret lathes or automatic screw machines.

A main object of this invention is to provide an extension plug for a tool holder shank of simple construction which is easy to apply and which will lengthen the holder shank to provide substantial clamping surface for effectively securing the tool holder in the turret.

Other objects of this invention will appear from the following description and claim, and from the accompanying drawing, wherein:

The tool holders used in turret lathes and automatic screw machines ordinarily are provided with hollow cylindrical shank portions which are inserted in the round openings of the turret and clamped in operating position by means of clamping bolts provided on the turret. The security of clamping depends to a major degree on the amount of clamping surface presented to the turret by the holder shank. It is frequently found that the shank is too short to provide adequate securement. The provision of a means for lengthening the holder shank introduces a substantial degree of versatility to tool holders which otherwise would be satisfactory for only a limited number of lathe operations.

Figure 1:
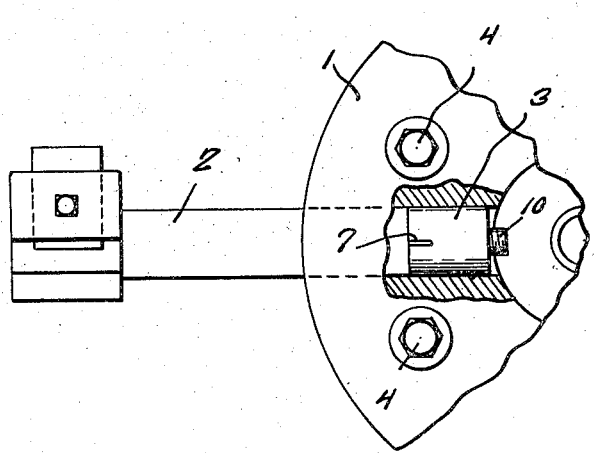
Figure 1 is a plan view partly in section showing a tool holder provided with an extension plug according to this invention poistioned in the turret of a turret lathe.

Referring to Figure 1, a lathe turret I is disclosed wherein a tool holder shank 2 provided with an extension plug 3 is secured. Clamping bolts 4 are employed to clamp the holder shank to the turret in the conventional manner. It can be seen from Figure 1 that without extension plug 3 the length of shank 2 for correct positioning of the tool with respect to the work would be relatively inadequate to insure sufficient clamping area to hold the shank rigid with respect to the turret upon tightening of the clamping bolts 4.

Figure 2:
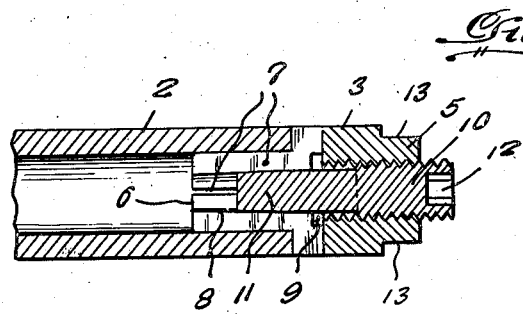
Figure 2 is a longitudinal cross sectional view of a tool holder shank provided with an extension plug according to this invention.
Figure 3:
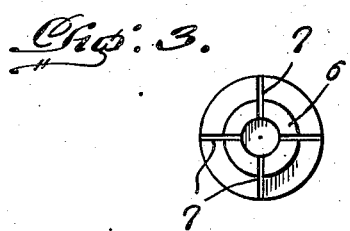
Figure 3 is an elevational view of one end of an extension plug according to this invention.
Figure 4:
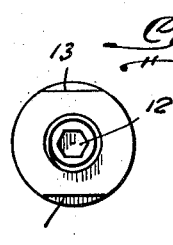
Figure 4 is an elevational view of the other end of an extension plug according to this invention.

Extension plug 3, as shown in Figures 2, 3 and 4, comprises a tubular body member having a head portion 5 and a foot portion consisting of relatively yieldable segments 6, formed by providing the foot portion with slots 7 extending from the inner end of the plug to about the middle thereof. The internal bore of the plug is provided with an inwardly flaring tapered surface 8 extending the length of the segments 6 and terminating in an undercut recess 9. The head portion 5 is provided with an axial threaded bore which threadedly receives a screw member 10. Screw member 10 has an inwardly projecting tapered end portion 11 adapted to cooperate with the tapered bore surface 8 to expand segments 6 when screw member 10 is screwed in and to thus secure the plug to shank 2. The outer end of screw member 10 is provided with a recess 12 formed to receive the end of a hexagonal bar used as a wrench to turn the screw. Head portion 5 is provided with flattened portions 13 adapted to be engaged by an open end wrench to hold the plug against rotation while screw member 10 is being turned.

The taper of end portion 11 of screw member 10 is slightly less than the taper of surface 8 so that the bearing pressure of screw member 10 on surface 8 is localized. It has been found that removal or assembly of the plug with respect to a tool holder shank is facilitated by this provision of the slight differences in taper of the bearing surfaces. The undercut recess 9 is provided in order to facilitate the tapping of the threaded bore portion to provide a working depth for the entire thread length. It also helps to reduce the stiffness of the segments 6 and to distribute the stresses incidental to the spreading of said segments.

The slotted front end of the plug may have any desired number of slots and is not limited to the four slots 7 disclosed in the present embodiment. Furthermore, the tool receiving recess 12 may be of any conventional shape for actuation by any conventional driving tool, and the flattened portions 13 of the head portion 5 may be replaced by any required configuration for cooperating with a holding tool.

The plug may be used not only for extending the length of a shank of a tool holder but wherever it is desired to add length to a tubular shank or to provide a tubular shank with an element adopted to be secured against rotation while securely holding the shank, for example, as an internal chuck for pipe or tubing which is to be machined or polished.

While a specific embodiment of the invention has been disclosed, it is to be understood that various modifications within the spirit of the invention will occur to those skilled in the art. Therefore it is intended that no limitation be placed on the invention except as defined by the scope of the appended claim.

What is claimed is:

An extension plug for tubular machine tool holder shanks used in turret lathes and the like, said plug comprising a tubular member having an interiorly threaded head section and also having a foot section adapted to be inserted into the inner end of the tubular shank and terminating in a base part integral with the head section and overlying said end of the tubular shank and having at its inner end a recess communicating with the threaded bore of the head section, said foot section being provided with longitudinal slots forming expansible cylindrical segments, the inner surfaces of the segments being tapered with an inward flare, said plug further comprising screw means engaging the interior threads of said head section and also provided with an inwardly tapered stem on the inner end thereof, the taper of said stem being less than the interior taper of the foot segments, the free end of said screw means having a non-cylindrical socket for a turning wrench and the exterior surface of the free end of the head section being non-cylindrical for engagement by a holding wrench.

WALTER BILLMAN.